US012568330B2

(12) United States Patent
Liu et al.

(10) Patent No.: US 12,568,330 B2
(45) Date of Patent: Mar. 3, 2026

(54) INTEGRATED SOUNDING COMPONENT

(71) Applicant: AAC Microtech (Changzhou) Co., Ltd., Changzhou (CN)

(72) Inventors: Hailin Liu, Changzhou (CN); Hong Li, Changzhou (CN); Wu Wang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 193 days.

(21) Appl. No.: 18/629,974

(22) Filed: Apr. 9, 2024

(65) Prior Publication Data

US 2025/0203273 A1 Jun. 19, 2025

Related U.S. Application Data

(63) Continuation of application No. PCT/CN2023/139571, filed on Dec. 18, 2023.

(51) Int. Cl.

*H04R 25/00* (2006.01)
*H04R 1/28* (2006.01)
*H04R 9/06* (2006.01)
*H04R 9/02* (2006.01)

(52) U.S. Cl.

CPC ............. *H04R 1/2811* (2013.01); *H04R 9/06* (2013.01); *H04R 9/025* (2013.01)

(58) Field of Classification Search

CPC .. H04R 1/2811; H04R 2499/11; H04R 9/025; H04R 9/06; H04R 2400/11
USPC .......................................................... 381/348
See application file for complete search history.

(56) References Cited

U.S. PATENT DOCUMENTS

2021/0368272 A1* 11/2021 Wang ........................ H04R 9/06

FOREIGN PATENT DOCUMENTS

CN 213661917 U * 7/2021 ............... H04R 9/06

OTHER PUBLICATIONS

CN213661917U. Sounding Device (Year: 2021).*

* cited by examiner

*Primary Examiner* — Phylesha Dabney
(74) *Attorney, Agent, or Firm* — Wiersch Law Group

(57) ABSTRACT

The present application provides an integrated sounding component including an upper cover, a lower cover, and a sounding unit arranged in an accommodating space enclosed by the upper cover and the lower cover, the sounding unit dividing the accommodating space into a front cavity and a rear cavity. The sounding unit includes a basket frame, a vibration system, and a magnetic circuit system. The magnetic circuit system is configured as a hollow structure, and an isolating member is provided between the magnetic circuit system and the lower cover, which isolates the hollow structure from the front cavity. The hollow structure and the isolating member together form a middle cavity in communication with the rear cavity. The integrated sounding component of the present application increases the volume of the rear cavity by providing a hollow structure in the magnetic circuit system, thereby improving the product's low frequency performance.

11 Claims, 2 Drawing Sheets

INTEGRATED SOUNDING COMPONENT

CROSS-REFERENCE TO RELATED APPLICATIONS

This application is a continuation of International Application No. PCT/CN2023/139571, filed on Dec. 18, 2023, the entire contents of which are incorporated herein by reference.

TECHNICAL FIELD

The present application relates to the field of electroacoustic conversion, in particular to an integrated sounding component.

BACKGROUND

With the development of mobile communication technology, integrated sounding components have been widely utilized in smart mobile devices, such as smartphones, handheld gaming consoles, and laptops. Serving as the sound playback device, the design quality of integrated sounding components directly affects the communication quality of the product, especially the size of the rear cavity of the integrated sounding component, which directly relates to the product's acoustic performance.

The integrated sounding components in the related art include a housing with an accommodating space and a sounding unit accommodated within it. The sounding unit divides the accommodating space into a front cavity and a rear cavity, with the front cavity being a cavity between the sounding unit and the sound-emitting hole, and the rear cavity being capable of being filled with sound-absorbing particles. Due to the miniaturization and slimming down of electronic devices such as smartphones and tablets, the mounting space reserved for sounding components is becoming increasingly limited, resulting in a limited volume for the rear cavity of the sounding component. This limitation is unfavorable for the low-frequency extension of the sounding unit, leading to sharper sound and decreased resolution emitted by the sounding component, and significantly affecting the sound quality of the speaker.

Therefore, it is necessary to propose a new technical solution to solve the above technical problems.

SUMMARY

An object of the present application is to provide an integrated sounding component that increases the volume of the rear cavity to improve low frequency performance.

The technical solution of the present application is as follows: an integrated sounding component comprising:

- an upper cover;
- a lower cover arranged opposite to the upper cover; and
- a sounding unit arranged in an accommodating space enclosed by the upper cover and the lower cover, the sounding unit comprising a basket frame, a vibration system fixed to the basket frame, and a magnetic circuit system;

wherein a mounting rim is protruded and formed on a top surface of the lower cover, and the sounding unit is mounted within the mounting rim; the magnetic circuit system is configured as a hollow structure along a direction from the front cavity to the rear cavity; an isolating member with a closed ring shape is provided between the magnetic circuit system and the lower cover; one end of the isolating member is sealingly connected to the magnetic circuit system and surrounds the hollow structure, and the other end of the isolating member is sealingly connected to an inner wall surface of the lower cover; an inner wall surface of the upper cover, an outer wall surface of the mounting rim, the inner wall surface of the lower cover, and the sounding unit together enclose a rear cavity; at least a portion of the rear cavity surrounds a peripheral edge of the sounding unit and is lower in height than the sounding unit; the sounding unit, the inner wall surface of the mounting rim, the inner wall surface of the lower cover, and an outer wall surface of the isolating member together enclose a front cavity; the isolating member is configured to isolate the hollow structure from the front cavity; the hollow structure, an inner wall surface of the isolating member, and the inner wall surface of the lower cover together enclose a middle cavity, and the middle cavity is in communication with the rear cavity.

In some embodiments, the magnetic circuit system comprises a lower clamping plate spaced from the upper cover, a main magnetic assembly arranged on the lower clamping plate, and a sub-magnetic assembly arranged around the main magnetic assembly; the isolating member is sandwiched between the main magnetic assembly and the lower cover.

In some embodiments, the main magnetic assembly comprises a first main magnetic steel arranged on the lower clamping plate, a main pole core arranged on the first main magnetic steel, and a second main magnetic steel arranged on the main pole core; the sub-magnetic assembly comprises a plurality of sub-magnetic steels arranged on the lower clamping plate and surrounding the main magnetic assembly, and a plurality of sub-pole cores arranged on the sub-magnetic steels; the isolating member is sandwiched between the second main magnetic steel and the lower cover, and the hollow structure is formed throughout the lower clamping plate, the first main magnetic steel, the main pole core, and the second main magnetic steel.

In some embodiments, the vibration system comprises a diaphragm fixed to the basket frame, an elastic support member arranged opposite to the diaphragm, a skeleton connecting the diaphragm and the elastic support member, and a voice coil configured to drive the diaphragm to vibrate; the voice coil is fixed to the skeleton and inserted in a magnetic gap formed by the main magnetic assembly and the sub-magnetic assembly.

In some embodiments, the skeleton comprises a main body portion, a first portion extending from an outer peripheral edge of the main body portion toward the lower clamping plate, and a second portion extending from an inner peripheral edge of the main body portion toward the lower clamping plate; the elastic support member is connected to the first portion, and the voice coil is connected to the second portion.

In some embodiments, the diaphragm comprises a first folded ring portion fixed to the basket frame, a second folded ring portion surrounded by the first folded ring portion, and a dome connecting the first folded ring portion and the second folded ring portion; an inner peripheral edge of the first folded ring portion is fixed to the main body portion; an inner peripheral edge of the second folded ring portion being fixed to the main body portion; the main body portion acts as the dome, and the inner peripheral edge of the second folded ring portion is fixed to the second main magnetic steel and abutted against an outer surface of the isolating member.

In some embodiments, the elastic support member extends from an inner surface of the first portion toward the main body portion to form an electrical connection portion; the electrical connection portion is fixed to the main body portion, and a lead wire of the voice coil is connected to the electrical connection portion.

In some embodiments, the integrated sounding component further comprises a breathable isolating member provided in the rear cavity and spaced apart from the sounding unit, wherein the breathable isolating member divides the rear cavity into a first rear cavity and a second rear cavity, the first rear cavity being filled with sound-absorbing particles, and the second rear cavity being in communication with the middle cavity.

In some embodiments, the skeleton and the diaphragm are integrally injection molded.

In some embodiments, one end of the isolating member is abutted against the magnetic circuit system, and the other end of the isolating member is abutted against the inner wall surface of the lower cover.

In some embodiments, the isolating member is integrally connected to the inner wall surface of the lower cover, and an end of the isolating member away from the lower cover is abutted against the magnetic circuit system.

The beneficial effects of the present application are as follows: in the present application, under certain volume constraints of the integrated sounding component, the magnetic circuit system of the integrated sounding component is configured as a hollow structure from the front cavity to the rear cavity, and an isolating member is provided between the magnetic circuit system and the lower cover, such that the hollow structure of the magnetic circuit system and the isolating member together enclose a middle cavity in communication with the rear cavity, thereby increasing the volume of the rear cavity of the integrated sounding component. This improves the low-frequency performance of the integrated sound-generating component, lowers resonant frequency (F0), and enhances the acoustic quality.

100, integrated sounding component; 11, upper cover; 12, lower cover; 121, mounting rim; 13, accommodating space; 131, front cavity; 132, rear cavity; 132*a*, first rear cavity; 132*b*, second rear cavity; 133, middle cavity; 2, sounding unit; 21, magnetic circuit system; 211, lower clamping plate; 212, main magnetic assembly; 212*a*, first main magnetic steel; 212*b*, main pole core; 212*c*, second main magnetic steel; 213, sub-magnetic assembly; 213*a*, sub-magnetic steel; 213*b*, sub-pole core; 214, magnetic gap; 22, vibration system; 221, diaphragm; 221*a*, first folded ring section; 221*b*, second folded ring section; 222, elastic support member; 222*a*, electrical connection section; 223, skeleton; 223*a*, main body portion; 223*b*, first portion; 223*c*, second portion; 224, voice coil; 224*a*, lead wire; 23, basket frame; 3, isolating member; and 4, breathable isolating member.

DETAILED DESCRIPTION OF THE EMBODIMENTS

The present application is further described below in combination with the accompanying drawings and embodiments.

Figure 1:
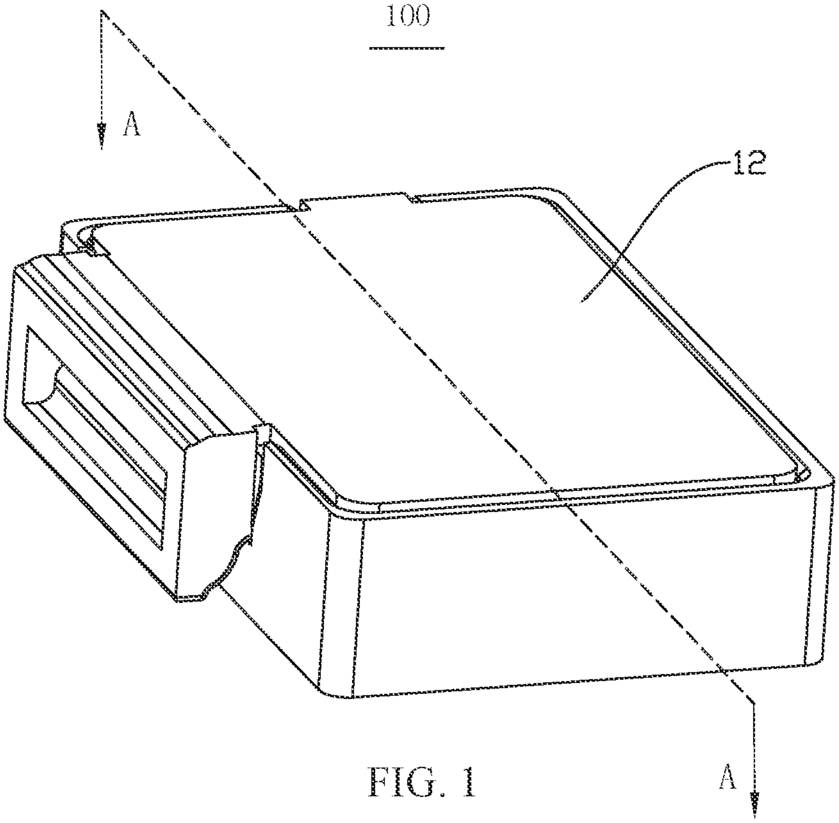
FIG. 1 shows a three-dimensional view of an integrated sounding component provided by the present application.
Figure 2:
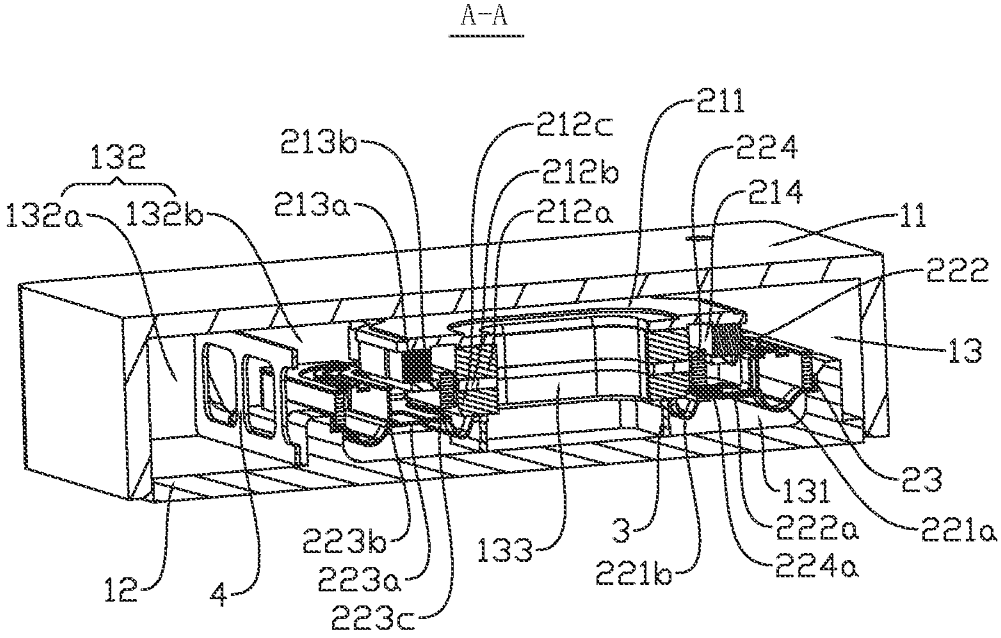
FIG. 2 shows a sectional view along line A-A in FIG. 1.
Figure 3:
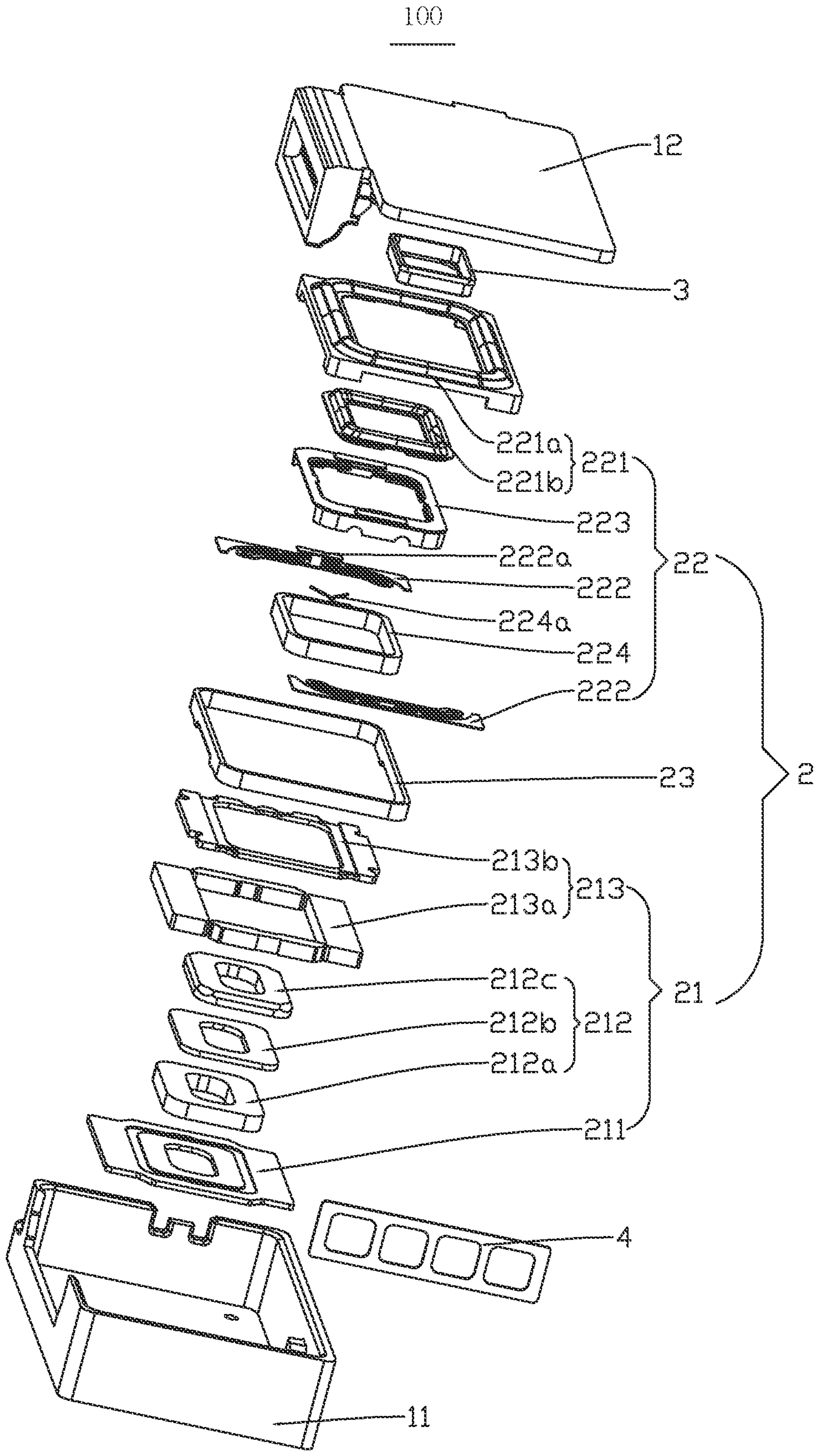
FIG. 3 shows a three-dimensional exploded view of the integrated sounding component provided by the present application.

As shown in FIGS. 1 to 3, the integrated sounding component 100 provided by the present application includes an upper cover 11, a lower cover 12 arranged opposite to the upper cover 11, and a sounding unit 2 arranged in an accommodating space 13 enclosed by the upper cover 11 and the lower cover 12. The sounding unit 2 divides the accommodating space 13 into a front cavity 131 and a rear cavity 132.

The sounding unit 2 includes a basket frame 23 and a vibration system 22 fixed to the basket frame 23, and a magnetic circuit system 21 accommodated in the basket frame 23 and configured to drive the vibration system 22 to vibrate.

The magnetic circuit system 21 includes a lower clamping plate 211 spaced apart from the upper cover 11, a main magnetic assembly 212 arranged on the lower clamping plate 211, and a sub-magnetic assembly 213 arranged around the main magnetic assembly 212. The main magnetic assembly 212 includes a first main magnetic steel 212*a* arranged on the lower clamping plate 211, a main pole core 212*b* arranged on the first main magnetic steel 212*a*, and a second main magnetic steel 212*c* arranged on the main pole core 212*b*, and a second main magnetic steel 212*c* arranged on the main pole core 212*b*. The sub-magnetic assembly 213 includes four pieces of sub-magnetic steels 213*a* arranged on the lower clamping plate 211 and arranged around the main magnetic assembly 212, and a sub-pole core arranged on the four pieces of sub-magnetic steels 213*b*. The four pieces of sub-magnetic steels 213*a* are arranged symmetrically with respect to the main magnetic assembly 212 in any direction, which is capable of enhancing the compactness and stability of the structure. A magnetic gap 214 is formed between the main magnetic assembly 212 and the sub-magnetic assembly 213.

The vibration system 22 includes a diaphragm 221 fixed to the basket frame 23, an elastic support member 222 arranged opposite to the diaphragm 221, a skeleton 223 connecting the diaphragm 221 and the elastic support member 222, and a voice coil 224 configured to drive the diaphragm 221 to vibrate. The voice coil 224 is fixed to the skeleton 223 and inserted in the magnetic gap 214 formed by the main magnetic assembly 212 and the sub-magnetic assembly 213. The integrated sounding component 100 drives the voice coil 224 by the magnetic field generated by the magnetic circuit system 21 in the magnetic gap 214, and utilizes the voice coil 224 to drive the diaphragm 221 to vibrate, thereby generating sound.

A mounting rim 121 is protruded and formed on a top surface of the lower cover 12 of the present application, and the sounding unit 2 is mounted within the mounting rim 121. The magnetic circuit system 21 is configured as a hollow structure along a direction from the front cavity 131 to the rear cavity 132. An isolating member 3 with a closed ring shape is provided between the magnetic circuit system 21 and the lower cover 12. One end of the isolating member 3 is sealingly connected to the magnetic circuit system 21 and surrounds the hollow structure, and the other end of the isolating member 3 is sealingly connected to an inner wall surface of the lower cover 12. An inner wall surface of the upper cover 11, an outer wall surface of the mounting rim 121, the inner wall surface of the lower cover 12, and the sounding unit 2 together enclose a rear cavity 132. At least a portion of the rear cavity 132 surrounds a peripheral edge of the sounding unit 2 and is lower in height than the sounding unit 2. The sounding unit 2, the inner wall surface of the mounting rim 121, the inner wall surface of the lower cover 12, and an outer wall surface of the isolating member 3 together enclose a front cavity 131. The isolating member 3 isolates the hollow structure from the front cavity 131. The hollow structure, an inner wall surface of the isolating member 3, and the inner wall surface of the lower cover 12 together form a middle cavity 133, and the middle cavity 133 is in communication with the rear cavity 132. In this embodiment, at least a portion of the rear cavity 132 surrounds the peripheral edge of the sounding unit 2 and is lower in height than the sounding unit 2, so that the rear cavity 132 is itself partially surrounded by the front cavity 131, and a portion of the middle cavity 133 formed inside the front cavity 131 as well as inside the magnetic circuit system 21 also functions as the rear cavity, thereby increasing the volume of the rear cavity 132, increasing a ratio of the rear cavity 132 to the front cavity 131, and effectively improving the low-frequency performance of the integrated sounding component 100. Besides, the increased volume of the rear cavity 132 makes the internal airflow of the sounding unit 2 smoother, which is more conducive to heat dissipation of the sounding unit 2.

Further, one end of the isolating member 3 is abutted against the magnetic circuit system 21, and the other end of the isolating member 3 is abutted against the inner wall surface of the lower cover 12. Alternatively, the isolating member 3 is integrally connected to the inner wall surface of the lower cover 12, and an end of the isolating member 3 away from the lower cover 12 is abutted against the magnetic circuit system 21. The isolating member 3 is directly and sealedly connected to the inner wall surface of the lower cover 12, which can utilize the inner wall surface of the lower cover 12 to form a wall surface of the middle cavity 133, without the need to set up an additional structure for sealing the middle cavity 133, which can reduce the thickness and enhance the volume of the rear cavity 132, thereby saving materials and obtaining a lower cost.

Further, as shown in FIG. 2, the integrated sounding component 100 further includes a breathable isolating member 4 arranged within the rear cavity 132 and spaced apart from the sounding unit 2. The breathable isolating member 4 separates the rear cavity 132 into a first rear cavity 132*a* and a second rear cavity 132*b*, and the second rear cavity 132*b* is in communication with the middle cavity 133. The first rear cavity 132*a* is filled with acoustic absorptive particles, thereby further improving the low frequency performance.

Specifically, as shown in FIG. 2, the hollow structure is formed throughout the lower clamping plate 211, the first main magnetic steel 212*a*, the main pole core 212*b*, and the second main magnetic steel 212*c*, and the isolating member 3 is sandwiched between the main magnetic assembly 212 and the lower cover 12. Further, the isolating member 3 is sandwiched between the second main magnetic steel 212*c* and the lower cover 12.

Further, as shown in FIGS. 2 and 3, the skeleton 223 includes a main body portion 223*a*, a first portion 223*b* extending from an outer peripheral edge of the main body portion 223*a* toward the lower clamping plate 211, and a second portion 223*c* extending from an inner peripheral edge of the main body portion 223*a* toward the lower clamping plate 211. The elastic support member 222 is connected to the first portion 223*b*, and the voice coil 224 is connected to the second portion 223*c*.

The diaphragm 221 includes a first folded ring portion 221*a* fixed to the basket frame 23, a second folded ring portion 221*b* surrounded by the first folded ring portion 221*a*, and a dome connecting the first folded ring portion 221*a* and the second folded ring portion 221*b*. An inner peripheral edge of the first folded ring portion 221*a* is fixed to the main body portion 223*a*, and an outer peripheral edge of the second folded ring portion 221*b* is fixed to the main body portion 223*a*. The main body portion 223*a* acts as a dome of the diaphragm 221. The first portion 223*b* is fixed to the first folded ring portion 221*a*, and the second portion 223*c* is fixed to the second folded ring portion 221*b*. An inner peripheral edge of the second folded ring portion 221*b* is fixed to the second main magnetic steel 212*c* and abutted against an outer surface of the isolating member 3.

In this embodiment, the skeleton 223 and the diaphragm 221 are integrally injection molded.

As shown in FIGS. 2 and 3, the elastic support member 222 extends from the inner surface of the first portion 223*b* toward the main body portion 223*a* to form an electrical connection portion 222*a*. The electrical connection portion 222*a* is fixed to the main body portion 223*a* to facilitate connecting the lead wire 224*a* of the voice coil 224 to the electrical connection portion 222*a*. The voice coil 224 is driven by the magnetic field generated in the magnetic gap 214 by the magnetic circuit system 21, and the voice coil 224 is used to drive the diaphragm 221 to vibrate, thereby generating sound.

In the integrated sounding component of the present application, the magnetic circuit system is configured as a hollow structure from the front cavity to the rear cavity, and an isolating member is provided between the magnetic circuit system and the lower cover, so that the hollow structure of the magnetic circuit system and the isolating member together form a middle cavity in communication with the rear cavity. This increases the volume of the rear cavity, thereby allowing the integrated sounding component to make full use of the space of the magnetic circuit system without changing the overall volume of the system. As a result, it increases the volume of the rear cavity and improves the acoustic performance of the speaker system.

Described above are only embodiments of the present application. It should be noted herein that improvements may be made for those of ordinary skill in the art without departing from the inventive conception of the present application, but these fall within the protection scope of the present application.

What is claimed is:

1. An integrated sounding component, comprising:

an upper cover;

a lower cover arranged opposite to the upper cover; and a sounding unit arranged in an accommodating space enclosed by the upper cover and the lower cover, the sounding unit comprising a basket frame, a vibration system fixed to the basket frame, and a magnetic circuit system;

wherein a mounting rim is protruded and formed on a top surface of the lower cover, and the sounding unit is mounted within the mounting rim; the magnetic circuit system is configured as a hollow structure along a direction from the front cavity to the rear cavity; an isolating member with a closed ring shape is provided between the magnetic circuit system and the lower cover; one end of the isolating member is sealingly connected to the magnetic circuit system and surrounds the hollow structure, and the other end of the isolating member is sealingly connected to an inner wall surface of the lower cover; an inner wall surface of the upper cover, an outer wall surface of the mounting rim, the inner wall surface of the lower cover, and the sounding unit together enclose a rear cavity; at least a portion of the rear cavity surrounds a peripheral edge of the sounding unit and is lower in height than the sounding unit; the sounding unit, the inner wall surface of the mounting rim, the inner wall surface of the lower cover, and an outer wall surface of the isolating member together enclose a front cavity; the isolating member is configured to isolate the hollow structure from the front cavity; the hollow structure, an inner wall surface of the isolating member, and the inner wall surface of the lower cover together enclose a middle cavity, and the middle cavity is in communication with the rear cavity.

2. The integrated sounding component of claim 1, wherein the magnetic circuit system comprises a lower clamping plate spaced from the upper cover, a main magnetic assembly arranged on the lower clamping plate, and a sub-magnetic assembly arranged around the main magnetic assembly; the isolating member is sandwiched between the main magnetic assembly and the lower cover.

3. The integrated sounding component of claim 2, wherein the main magnetic assembly comprises a first main magnetic steel arranged on the lower clamping plate, a main pole core arranged on the first main magnetic steel, and a second main magnetic steel arranged on the main pole core; the sub-magnetic assembly comprises a plurality of sub-magnetic steels arranged on the lower clamping plate and surrounding the main magnetic assembly, and a plurality of sub-pole cores arranged on the sub-magnetic steels; the isolating member is sandwiched between the second main magnetic steel and the lower cover, and the hollow structure is formed throughout the lower clamping plate, the first main magnetic steel, the main pole core, and the second main magnetic steel.

4. The integrated sounding component of claim 3, wherein the vibration system comprises a diaphragm fixed to the basket frame, an elastic support member arranged opposite to the diaphragm, a skeleton connecting the diaphragm and the elastic support member, and a voice coil configured to drive the diaphragm to vibrate; the voice coil is fixed to the skeleton and inserted in a magnetic gap formed by the main magnetic assembly and the sub-magnetic assembly.

5. The integrated sounding component of claim 4, wherein the skeleton comprises a main body portion, a first portion extending from an outer peripheral edge of the main body portion toward the lower clamping plate, and a second portion extending from an inner peripheral edge of the main body portion toward the lower clamping plate; the elastic support member is connected to the first portion, and the voice coil is connected to the second portion.

6. The integrated sounding component of claim 5, wherein the diaphragm comprises a first folded ring portion fixed to the basket frame, a second folded ring portion surrounded by the first folded ring portion, and a dome connecting the first folded ring portion and the second folded ring portion; an inner peripheral edge of the first folded ring portion is fixed to the main body portion; an inner peripheral edge of the second folded ring portion being fixed to the main body portion; the main body portion acts as the dome, and the inner peripheral edge of the second folded ring portion is fixed to the second main magnetic steel and abutted against an outer surface of the isolating member.

7. The integrated sounding component of claim 5, wherein the elastic support member extends from an inner surface of the first portion toward the main body portion to form an electrical connection portion; the electrical connection portion is fixed to the main body portion, and a lead wire of the voice coil is connected to the electrical connection portion.

8. The integrated sounding component of claim 6, wherein the skeleton and the diaphragm are integrally injection molded.

9. The integrated sounding component of claim 1, further comprising a breathable isolating member provided in the rear cavity and spaced apart from the sounding unit, wherein the breathable isolating member divides the rear cavity into a first rear cavity and a second rear cavity, the first rear cavity being filled with sound-absorbing particles, and the second rear cavity being in communication with the middle cavity.

10. The integrated sounding component of claim 1, wherein one end of the isolating member is abutted against the magnetic circuit system, and the other end of the isolating member is abutted against the inner wall surface of the lower cover.

11. The integrated sounding component of claim 1, wherein the isolating member is integrally connected to the inner wall surface of the lower cover, and an end of the isolating member away from the lower cover is abutted against the magnetic circuit system.

* * * * *